(12) United States Patent
Steinberg

(10) Patent No.: US 6,848,839 B2
(45) Date of Patent: Feb. 1, 2005

(54) METHODS AND DEVICES FOR COUPLING OPTOELECTRONIC PACKAGES

(75) Inventor: Dan A. Steinberg, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/827,183

(22) Filed: Apr. 6, 2001

(65) Prior Publication Data

US 2001/0031117 A1 Oct. 18, 2001

Related U.S. Application Data

(60) Provisional application No. 60/195,636, filed on Apr. 7, 2000.

(51) Int. Cl.[7] ................................................. G02B 6/36
(52) U.S. Cl. .......................... 385/88; 385/65; 385/83; 385/92
(58) Field of Search ........................... 385/31, 49, 83, 385/88, 89, 90, 91

(56) References Cited

U.S. PATENT DOCUMENTS

| | | | |
|---|---|---|---|
| 4,217,032 A | | 8/1980 | Sheem |
| 4,639,074 A | | 1/1987 | Murphy |
| 4,750,804 A | | 6/1988 | Osaka et al. |
| 4,756,590 A | | 7/1988 | Forrest et al. |
| 4,818,059 A | | 4/1989 | Kakii et al. |
| 5,073,003 A | * | 12/1991 | Clark ........................... 385/33 |
| 5,123,068 A | | 6/1992 | Hakoun et al. |
| 5,163,113 A | | 11/1992 | Melman |
| 5,181,263 A | | 1/1993 | Derfiny |
| 5,185,835 A | | 2/1993 | Vial et al. |
| 5,390,271 A | | 2/1995 | Priest |
| 5,479,540 A | * | 12/1995 | Boudreau et al. .............. 385/14 |
| 5,499,309 A | | 3/1996 | Kozuka et al. |
| 5,499,312 A | | 3/1996 | Hahn et al. |
| 5,535,296 A | * | 7/1996 | Uchida .......................... 385/89 |
| 5,557,695 A | | 9/1996 | Yamane et al. |
| 5,577,142 A | * | 11/1996 | Mueller-Fiedler et al. ..... 385/47 |
| 5,627,931 A | * | 5/1997 | Ackley et al. ................. 385/88 |
| 5,961,683 A | | 10/1999 | Mizuta et al. |
| 5,970,200 A | | 10/1999 | Takikawa et al. |
| 6,048,107 A | | 4/2000 | Pubanz |
| 6,062,741 A | | 5/2000 | Tachigori |
| 6,081,638 A | | 6/2000 | Zhou |
| 6,132,107 A | * | 10/2000 | Morikawa ...................... 385/89 |
| 6,215,946 B1 | * | 4/2001 | Sherrer ......................... 385/137 |
| 6,363,201 B2 | * | 3/2002 | Sherrer et al. ............... 385/137 |
| 6,526,204 B1 | * | 2/2003 | Sherrer et al. ................. 385/49 |
| 6,595,700 B2 | * | 7/2003 | Steinberg et al. .............. 385/92 |

FOREIGN PATENT DOCUMENTS

JP          3914835 C1 * 7/1990 ............ G02B/6/42

* cited by examiner

Primary Examiner—Phan T. H. Palmer
Assistant Examiner—Jennifer Doan
(74) Attorney, Agent, or Firm—Jonathan D. Baskin

(57) ABSTRACT

Optoelectronic packages comprise both an optical array and base chip. The array and base chip are aligned and coupled using a combination of V-grooves, wick stops, and alignment spheres (e.g., presion ball bearings). The array and base chip are passively aligned by disposeing an optical fiber having an angled endface onto V-grooves in both the array and base chip. The base chip typically comprises an optical surface device, such as a vertical cavity, surface emitting laser or photodetector.

28 Claims, 4 Drawing Sheets

METHODS AND DEVICES FOR COUPLING OPTOELECTRONIC PACKAGES

The present application claims the benefit of priority of co-pending patent application Ser. No. 60/195,636 filed on Apr. 7, 2000, the disclosure of which is hereby incorporated by reference.

BACKGROUND OF THE INVENTION

Nowadays, more and more information is being transmitted over optical fiber or via optical components instead of traditional copper wire. Connecting two components together has always been important. As the trend towards the use of optical components increases, so will the need to insure that such components are correctly connected together. If optical components become disconnected or are improperly aligned (i.e., connected) from the beginning, the consequences can be severe. Even small misalignments can result in significant reductions in signal power.

For example, sometimes two separate sets of optical fibers need to be connected together. To do so requires that each set of fibers be properly aligned with one another. There exists a number of methods and devices for connecting both sets of fibers together. These existing methods and devices have drawbacks in that they do not provide for satisfactory alignment or require a relatively long time to do so. Neither is acceptable.

Similarly, sometimes optical components need to be connected together or require connection to an optical fiber. In each instance, the optical component and/or optical fiber must be aligned correctly.

Co-pending patent application Ser. No. 09/614,155 discloses the use of open face, optical fiber arrays for coupling integrated optical waveguides and optoelectronics submounts.

There are other optical components besides waveguides and submounts. One other class of devices is known as a "vertically active device". These devices either transmit or receive optical signals along a substantially vertical axis. One example of such a device is a vertical cavity, surface emitting laser ("VCSEL"). Hereafter, this class of device (including VCSELs) will be referred to as "a surface device" for short. It should be understood that the words "vertical" or "vertically" are relative terms because such a device may be rotated 90°, in effect shifting the vertical to horizontal and vice-versa. More precisely then, a surface device is one which emits or receives a signal at an angle which is substantially perpendicular to a base substrate or base chip.

Accordingly, it is a desire of the present invention to provide methods and devices for aligning and coupling surface devices and the like to optical components and optical fiber to form optoelectronic packages.

It is a further desire of the present invention to provide for methods and devices for aligning and coupling surface devices and the like to optical components and optical fiber with a high degree of precision.

Further desires will become apparent from the drawings, detail description of the invention and claims which follow.

SUMMARY OF THE INVENTION

In accordance with the present invention, there are provided optoelectronics packages, each comprising a base chip and optical fiber array. The chip comprises a surface device (e.g. a VCSEL), while the array comprises one or more optical fibers disposed in an "array V-groove".

The array may comprise a sealing lid designed to shield the surface device from the outside environment. The sealing lid may be made a part of the array which is holding the optical fiber ("one-piece" array) or may be a separate component ("two-piece" array). In addition, the lid may be made using a dicing saw to provide a more complete seal or shield.

The optical fibers used in packages envisioned by the present invention may have angled endfaces.

In order to provide ease of alignment and coupling of the array to the chip to form the package, only a rear portion of an optical fiber is bonded to the array during assembly of the package. The front portion is left unbonded until after assembly. This allows the front portion of the fiber to remain flexible so that it can be properly positioned relative to the surface device of the base chip.

To prevent the adhesive used in bonding the rear portion from flowing onto the front portion, the arrays envisioned by the present invention comprise wick stops between the front and rear portions. The wick stops effectively prevent the flow of adhesive.

In addition to a wick stop, the package may also comprise alignment spheres (e.g., precision ball bearings) for aligning the fiber in both longitudinal (i.e., in a direction parallel with the axis of an associated optical fiber) and vertical directions. This further improves the coupling of the array and base chip as well as the optical coupling of the surface device to the fiber.

The packages envisioned by the present invention include base chips which comprise ayers, such as $SiO_2$, $Al_2O_3$, or a silicon nitrate, such as SiN.

The present invention and its advantages can best be understood with reference to the drawings, detailed description of the invention and claims that follow.

DETAILED DESCRIPTION OF THE INVENTION

Figure 1A:
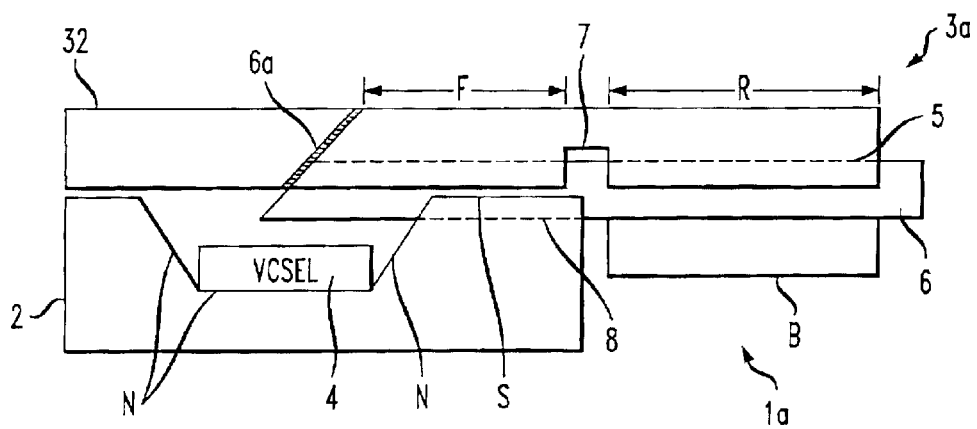
FIG. 1a depicts an optoelectronic package comprising an array having a front end sealing lid according to one embodiment of the present invention.

Referring to FIG. 1a there is shown an optoelectronic package 1a according to one embodiment of the present invention. The package 1a comprises a base chip 2 and array 3a. In more detail, the base chip 2 comprises a surface device 4, such as a VCSEL, disposed on a nonmating surface "N" of the chip 2.

In the embodiment shown in FIG. 1a, the array 3a comprises front end sealing lid 32. The sealing lid 32 functions to substantially enclose or shield the VCSEL 4 from the outside environment. There are many ways to affix the sealing lid 32 to the base chip 2. For example, the sealing lid 32 may be soldered to the base chip 2. It should be noted that the lid 32 is separate from the front end portion "F" of array 3a. As such, array 3a can be referred to as a "two-piece" array.

Figure 1B:
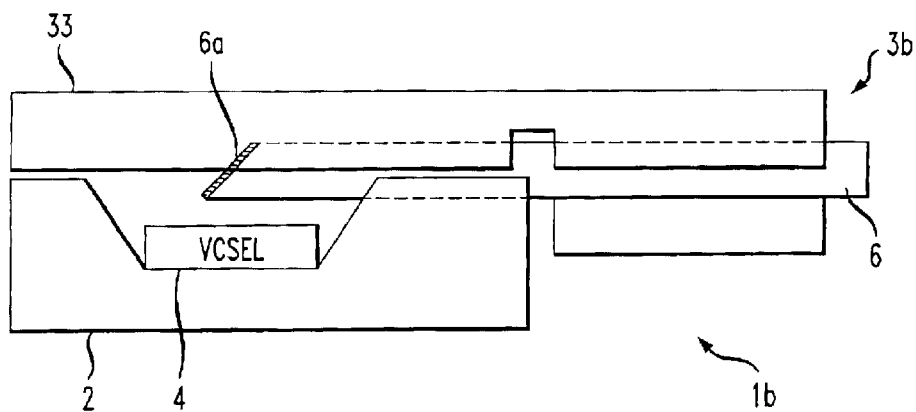
FIG. 1b depicts an optoelectronic package comprising an array having a monolithic, front end sealing lid according to one embodiment of the present invention.
Figure 1C:
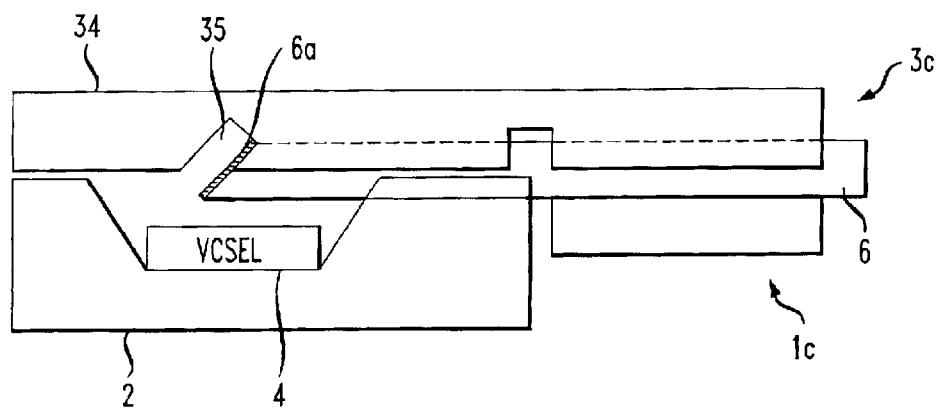
FIG. 1c depicts an optoelectronic package comprising an array having a monolithic, front end sealing lid formed using a dicing saw according to another embodiment of the present invention.

FIGS. 1b and 1c depict two alternative sealing lids 33, 34. In contrast to lid 32, lids 33 and 34 are made from the same substance as the balance of arrays 3b, 3c. Lids 33, 34 and arrays 3b, 3c can be referred to as "monolithic" or "one-piece" arrays.

Referring back to FIG. 1a, the array 3a further comprises an "array V-groove" or grooves 5 which extends from a rear end "R" of the array 3a to a the front end F. The array 3a comprises an optical fiber 6 having an angled endface 6a disposed in the V-groove 5. In addition to the array V-groove 5, the chip 2 may also comprise a V-groove 8 (referred to as a "base chip V-groove" to avoid confusion). In an illustrative embodiment of the present invention, the optical fiber 6 is bonded (e.g., glued or soldered) to the rear portion R of the array 3a, but is not bonded to the front portion F of the array 3a during alignment of the array 3a with the chip 2. The fiber 6 is eventually bonded to the front portion F as well but not until after the array 3a and chip 2 are properly aligned.

The array 3a further comprises a wick stop 7 located between the rear portion R and front portion F of the array 3a. The wick stop 7 functions to prevent glue (or another adhesive) which has been applied to the fiber 6 on the rear portion R of the array 3a from flowing to the front portion F during assembly of the package 1 (i.e., during alignment of the array 3a and chip 2). Because the front portion of the fiber 6 is unglued, it remains flexible allowing the fiber 6 to be set into the base chip V-groove 8. The base chip V-groove 8 is not always needed in order to couple the array 3a and chip 2. However, in many cases it is desirable. When the base chip 2 is formed with a V-groove 8 the optical fiber 6 may be disposed in the base chip V-groove 8 in order to substantially couple the chip 2 and the array 3a. From an alignment perspective, a package that has V-grooves in both the array and base chip has added benefits. Because a fiber is placed into both V-grooves, it provides additional passive alignment between the front portion F of the array and the base chip (i.e., alignment in a direction perpendicular to the drawing of FIG. 1a). Any glue which flows from the rear portion R towards the front portion F is prevented from reaching the fiber 6 associated with the front portion F because of the wick stop 7.

When the array 3a and chip 2 are positioned as shown in FIG. 1a, the optical fiber 6 is disposed on a mating surface "S" of the chip 2 to substantially couple the chip 2 and the array 3a. It can also be said that when the optical fiber 6 is properly disposed on the chip 2, signals emitted from the VCSEL 4 will be substantially, optically coupled into the fiber 6.

Figure 2:
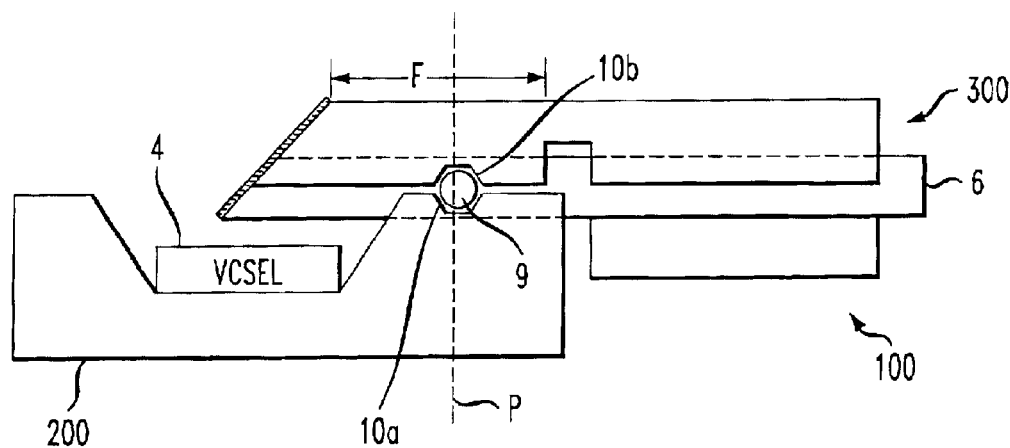
FIG. 2 depicts an optoelectronic package which comprises an alignment sphere according to one embodiment of the present invention.

The present invention envisions other ways to help align and couple VCSEL chips with optical fibers/arrays in addition to wick stops and V-grooves. In another embodiment of the present invention, alignment spheres are used to aid in the proper alignment of an optical fiber with a VCSEL. Referring to FIG. 2, there is shown an optoelectronic package 100 which comprises an alignment sphere (or spheres) 9. The alignment sphere 9 makes it possible to move the optical fiber 6 longitudinally (side-to-side) in FIG. 2. To account for the presence of alignment sphere 9, the array 300 comprises a first pit or indentation 10b and the base chip 200 comprises a second pit or indentation 10a. The alignment sphere 9 may comprise a precision ball bearing or the like composed of a ceramic, aluminum, glass or quartz.

The optoelectronics package 100 depicts the first pit 10b disposed in the front portion F of the array 300 at a position "P". It should be understood that the present invention also envisions positioning the pits 10a, 10b at different positions as well. As envisioned by the present invention, the pits 10a, 10b comprise pits having depths of 200 to 700 microns. One way of creating such pits 10a, 10b is by using a wet-etching technique (e.g., KOH etching of silicon).

Figure 3:
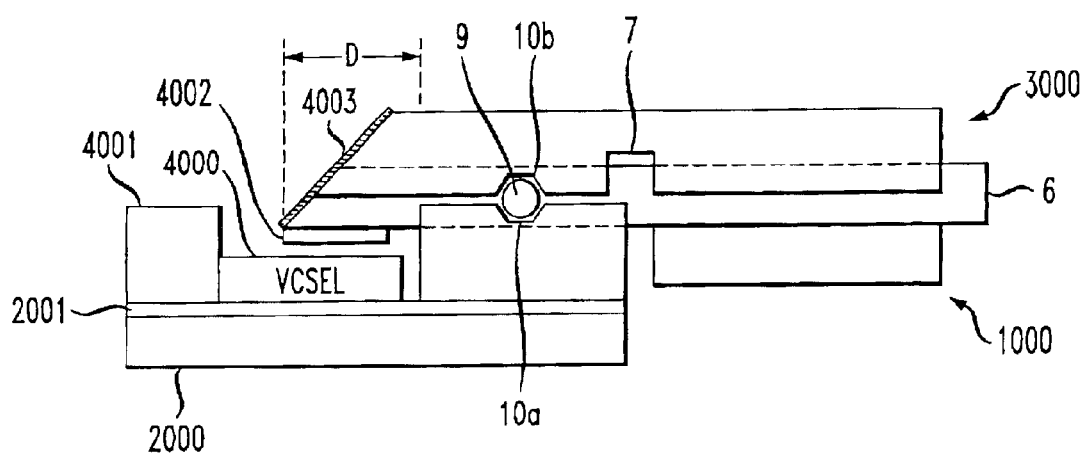
FIG. 3 depicts an optoelectronic package which comprises a base chip having an etch stop layer located under a VCSEL according to one embodiment of the present invention.

The optoelectronic packages shown in FIGS. 1a–c and 2 are not the only packages envisioned by the present invention which can make use of wick stops, V-grooves and alignment spheres. FIG. 3 depicts another optoelectronic package 1000. Similar to the optoelectronic package 100 shown in FIG. 2, package 1000 comprises a wick stop 7, V-grooves 5, 8 and an alignment sphere 9. Unlike the embodiment shown FIG. 2, the base chip 2000 comprises an etch stop layer 2001 disposed under the VCSEL 4000. This layer 2001 may comprise a number of insulators or insulation materials, such as $SiO_2$, $Al_2O_3$, or a silicon nitride, such as SiN, to name just a few. It should also be noted that the substrate 4001 has been etched using an RIE etched method. In the embodiment shown in FIG. 3, the array 3000 also comprises an optional glass window 4002.

It should be noted that all of the arrays shown in FIGS. 1–3 may also comprise a reflective coating 4003 disposed on the front end of the array 3 as depicted in FIG. 3. As noted above, the alignment spheres shown in FIGS. 2 and 3 are adapted to align the arrays with the VCSELs and chips. The present invention envisions that the front end of the optical fiber, such as optical fiber 6 shown in FIG. 3, should extend over the VCSEL 4000 a distance D which is small as possible. As envisioned by the present inventions, the distance D can be no more than 700 microns.

Figure 4:
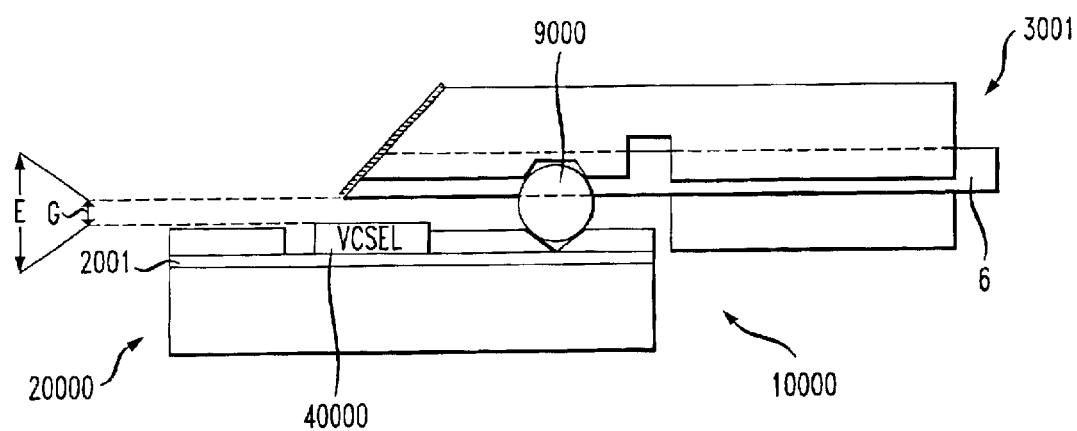
FIG. 4 depicts an optoelectronic package comprising an alignment sphere used to adjust the position of the fiber with respect to a VCSEL according to one embodiment of the present invention.
Figure 5:
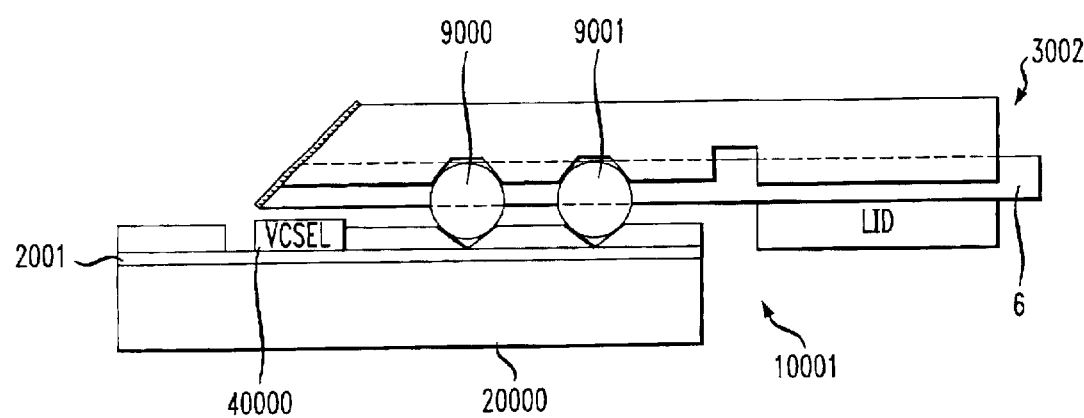
FIG. 5 depicts an optoelectronic package comprising a set of alignment spheres use to position an optical fiber with respect to a VCSEL according to another embodiment of the present invention.

Alignment spheres may be used to align an array and base chip in more that just a longitudinal direction. FIGS. 4 and 5 depict embodiments where one or more alignment spheres 9000, 9001 are adapted to position an optical fiber 6 in a vertical direction, E. As envisioned by the present invention, the spheres 9000, 9001 help maintain a distance "G" between the fiber 6 and VCSEL 9002 equal to 10–200 microns. It should be noted that the arrays 3001 and 3002 shown FIGS. 4 and 5 do not comprise V-grooves like the embodiments in FIGS. 1–3.

It is believed by the present inventors that the use of multiple alignment spheres 9000, 9001 adds additional flexibility and allows for increased ease in aligning the optical fiber 6 with the VCSEL 9002.

FIGS. 1–5 depict VCSELs disposed on a number of non-mating surfaces. Specifically, FIGS. 1–3 depict VCSELs disposed on anisotropic, wet etched surfaces (forming a so-called "pit") while FIGS. 4 and 5 depict VCSELs disposed on Reactive Ion Etched ("RIE") surfaces. It should be understood that either type of surface may be used in combination with other features to form packages envisioned by the present invention.

Each of the embodiments shown in FIGS. 1–5 depicts an array comprising a single optical fiber and VCSEL. It should be understood that the present invention is not so limited.

The optoelectronic packages shown in FIGS. 1–5 and those envisioned by the present invention may comprise several VCSELs as well several optical fibers. In each case, the optical fibers can be aligned and coupled to the lasers using the wick stops, V-grooves and alignment spheres discussed herein.

Figure 6:
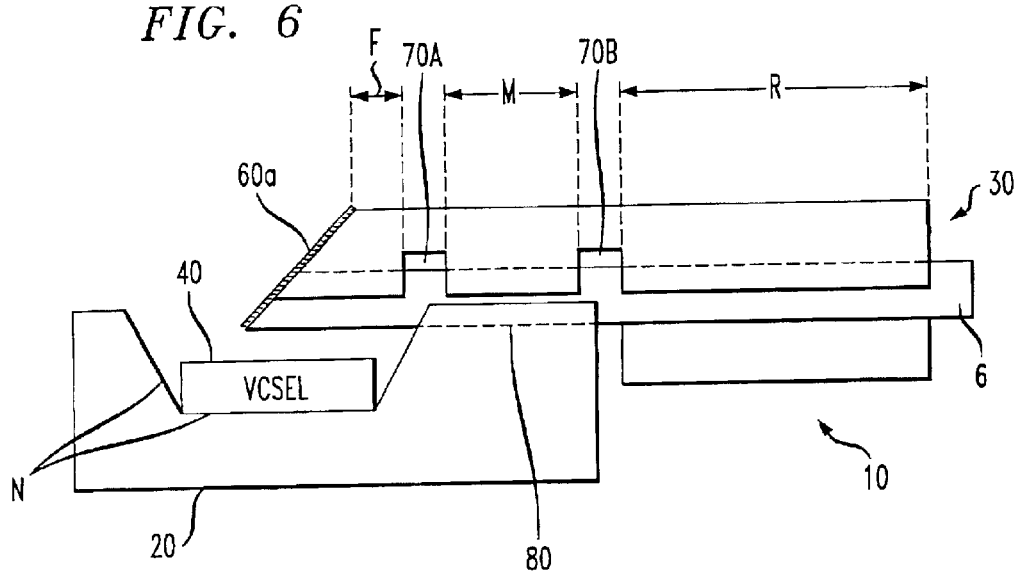
FIG. 6 depicts an optoelectronic package comprising an array having at least two wick stops according to one embodiment of the present invention.

The embodiments shown in FIGS. 1–5, have depicted the use of a single wick stop. In an additional embodiment of the present invention, multiple wick stops may be used to prevent the flow of glue from one portion of an array to another. Referring now to FIG. 6, there is depicted an optoelectronic package 10 comprising an array 30. The array 30 comprises two wick stops 70a, 70b. As envisioned by the present invention, the rear portion R of the array 30 is glued as is the front portion F while the middle portion M remains unglued during assembly of the package 10. The function of the two wick stops 70a, 70b is to prevent glue or the like from the rear and front portions from flowing into the unglued middle portion M. This allows the optical fiber 6 associated with the middle portion M to be loose and more flexible so that it can be precisely set in the groove 80 of the base clip 20. The wick stops 70a, 70b may be referred to as a first and second wick stop which border the unglued middle portion M of the array 30. It should be understood that after the fiber 6 and VCSEL 40 are so aligned, the middle portion M is then glued to the array 30.

Throughout this discussion we have mentioned that an optical fiber is bonded to an array by an adhesive such as glue. Alternatively, solder or another liquid, flowable adhesive may be used to create the appropriate bonds.

Figure 7:
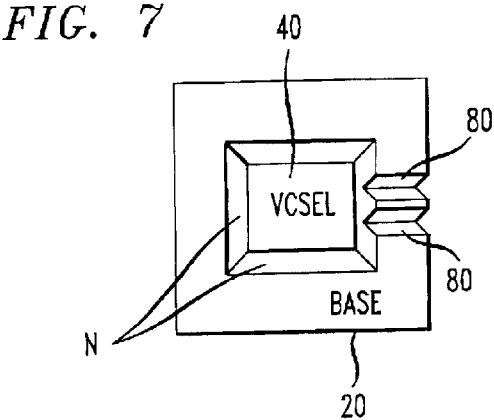
FIG. 7 depicts a top view of a surface device according to one embodiment of the present invention.
Figure 8:
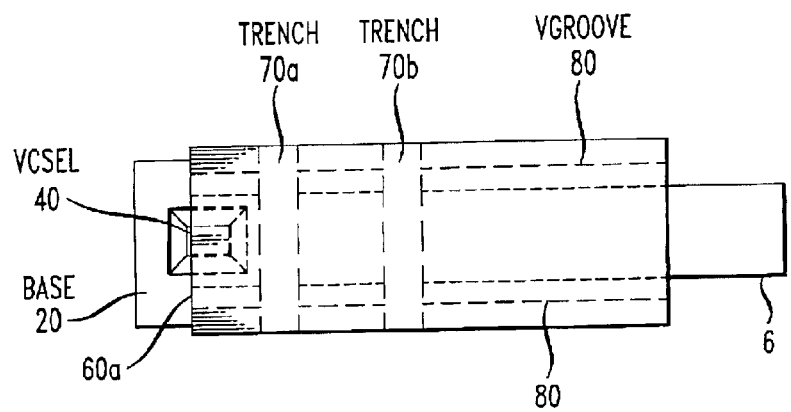
FIG. 8 depicts a top view of an array according to one embodiment of the invention.

FIG. 7 depicts a top view of a surface device 400 while FIG. 8 depicts a top view of an array shown in FIG. 6.

All of the embodiments shown in FIGS. 1–8 make use of optical fibers. Varying compositions and designs may be used. For example, one such fiber utilized by the present inventors has a diameter of 125 microns and is comprised of silica. Both single-mode and multi-mode fibers may be used as well.

The above discussion has set forth some examples of the ideas, features and functions related to the present invention by presenting illustrative examples and embodiments. It should be understood that the present invention is not limited to the examples given above. For example, instead of a VCSEL (i.e., transmitters) the optoelectronic packages envisioned by the present invention may comprise another type of surface device, such as a photodetector.

Other changes and variations may be made without departing from the spirit and scope of the present invention, as defined by the claims that follow.

I claim:

1. An optoelectronic package comprising:
    a base chip, the chip comprising a base chip V-groove;
    a fiber array, the array comprising an array V-groove formed in a rear portion and a front portion of the array;
    a first wick stop disposed between the rear and front portions; and
    an optical fiber, having an angled endface, disposed in both V-grooves to substantially couple the chip and array.

2. The optoelectronic package as in claim 1 wherein the array further comprises a sealing lid.

3. The optoelectronic package as in claim 2 wherein the sealing lid comprises a monolithic sealing lid.

4. The optoelectronic package as in claim 1 wherein the base chip further comprises an etch stop layer in the base chip.

5. The optoelectronic package as in claim 4 wherein the layer comprises $SiO_2$.

6. The optoelectronic package as in claim 4 wherein the layer comprises silicon nitride.

7. The optoelectronic package as in claim 4 wherein the layer comprises $Al_2O_3$.

8. The optoelectronic package as in claim 1 wherein the array comprises a first pit and the chip comprises a second pit.

9. The optoelectronic package as in claim 1 further comprising an alignment sphere, wherein the sphere is disposed between the first and second pits.

10. The optoelectronic package as in claim 1 wherein the array comprises a middle portion bordered by the first wick stop and a second wick stop.

11. The optoelectronic package as in claim 1 wherein the base chip further comprises a surface device.

12. The optoelectronic package as in claim 1 wherein the surface device comprises a VCSEL.

13. The optoelectronic package as in claim 1 wherein the surface device comprises a photodector.

14. A method for coupling optoelectronic packages comprising:
    forming a base chip V-groove in a base chip;
    forming an array V-groove in a rear portion and a front portion of a fiber array;
    disposing a first wick stop between the rear and front portions; and
    disposing an optical fiber, having an angled endface, in both V-grooves to substantially couple the chip and array.

15. The method as in claim 14 further comprising disposing a surface device on the base chip.

16. The method as in claim 15 wherein the surface device comprises a VCSEL.

17. The method as in claim 15 wherein the surface device comprises a photodector.

18. The method as in claim 14 further comprising enclosing the surface device within a sealing lid.

19. The method as in claim 18 wherein the sealing lid comprises a monolithic sealing lid.

20. The method as in claim 14 further comprising forming an etch stop layer in the base chip.

21. The method as in claim 20 wherein the layer comprises $SiO_2$.

22. The method as in claim 20 wherein the layer comprises silicon nitride.

23. The method as in claim 20 wherein the layer comprises Al$_2$O$_3$.

24. The method as in claim 14 further comprising forming a first pit on the array and a second pit on the base chip.

25. The method as in claim 24 further comprising disposing an alignment sphere between the first and second pits.

26. The method as in claim 14 further comprising forming a middle portion bordered by the first wick stop and a second wick stop.

27. An optoelectronic package comprising:
   a base chip;
   a surface device on the base chip;
   a fiber array, the array comprising an array V-groove formed in a rear portion and a front portion of the array;
   an optical fiber disposed in the V-groove to substantially couple the chip and array; and
   a first wick stop disposed between the rear and front portions effective to prevent adhesive to be applied to the optical fiber on the rear portion of the array from flowing to the front portion of the array during assembly of the package.

28. The optoelectronic package as in claim 27 wherein the array further comprises a sealing lid.

* * * * *